United States Patent
Moriyama et al.

(10) Patent No.: US 7,386,324 B2
(45) Date of Patent: Jun. 10, 2008

(54) SYSTEM AND METHOD FOR DUAL PATH TERMINAL CONNECTION

(75) Inventors: Takao Moriyama, Yokohama (JP); Kei Kawase, Sagamihara (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 523 days.

(21) Appl. No.: 10/247,950

(22) Filed: Sep. 20, 2002

(65) Prior Publication Data

US 2004/0198430 A1    Oct. 7, 2004

Related U.S. Application Data

(60) Provisional application No. 60/373,708, filed on Apr. 17, 2002.

(51) Int. Cl.
*H04M 1/00*    (2006.01)

(52) U.S. Cl. .............. 455/556.2; 455/445; 455/553.1; 709/239; 709/240; 345/169; 345/156; 370/232; 370/229

(58) Field of Classification Search .. 455/556.1–556.2, 455/566, 90.3, 411, 445, 553.1; 709/228, 709/227, 238–242; 345/156, 169; 370/229, 370/233, 232
See application file for complete search history.

(56) References Cited

U.S. PATENT DOCUMENTS

| | | | | |
|---|---|---|---|---|
| 6,453,159 | B1 * | 9/2002 | Lewis | 455/411 |
| 6,580,422 | B1 * | 6/2003 | Reilly | 345/169 |
| 6,832,082 | B1 * | 12/2004 | Ramaswamy et al. | 455/411 |
| 6,897,833 | B1 * | 5/2005 | Robinson et al. | 345/2.3 |
| 6,999,523 | B2 * | 2/2006 | Posti | 375/296 |
| 6,999,785 | B2 * | 2/2006 | Kito | 455/522 |
| 2002/0109665 | A1 * | 8/2002 | Matthews et al. | 345/156 |

FOREIGN PATENT DOCUMENTS

| | | |
|---|---|---|
| JP | 06-311102 | 11/1994 |
| JP | 07-302233 | 11/1995 |
| JP | 10-285655 | 10/1998 |
| JP | 11-146456 | 5/1999 |
| JP | 2000-341262 | 12/2000 |

\* cited by examiner

*Primary Examiner*—George Eng
*Assistant Examiner*—Marcos L Torres
(74) *Attorney, Agent, or Firm*—Anthony M. Del Zoppo, III; Driggs, Hogg, Daugherty & DelZoppo Co., LPA

(57) ABSTRACT

For communication between a display device and a processing apparatus (host), two connection modes are prepared, a wired connection mode, for communication along a wired connection path, and a wireless connection mode, for communication along a wireless connection path. Before entering the wireless connection mode, the processing apparatus (host) transmits, along the wired connection path to the display device, data required for the wireless connection of the display device 50 along the wireless connection path, and data required for authentication to permit information to be accessed using the wireless connection path.

5 Claims, 15 Drawing Sheets

SYSTEM AND METHOD FOR DUAL PATH TERMINAL CONNECTION

The present application claims priority to co-pending U.S. Provisonial application No. 60/373,708 filed Apr. 17, 2002.

FIELD OF THE INVENTION

The present invention relates to a system for establishing a wired connection path and a wireless connection path with a terminal, such as a display device, and more in particular to a system that enables smooth switching between a wired connection and a wireless connection.

DESCRIPTION OF RELATED ART

Recently, many products have become available that include portable monitors that enables users to easily access the Internet and use e-mail in wireless communication. A product of this type includes, for example, a base station and a portable liquid crystal monitor, and merely by carrying the monitor home, a user can gain wireless access to the Internet and use e-mail for communication.

The conventional product has a WWW (World Wide Web) browser function, and is generally designed to communicate with a server using the HTML standard and the HTTP protocol and to receive data using a display protocol, while the connection destination is limited to a WWW server. Further, a connection made by this product is limited to a host that corresponds to the software incorporated in the display terminal. In addition, the conventional product does not have a display function that provides as good a performance as a display employing a wired connection.

Assume that a display device has two connection modes: a wired connection and a wireless connection. When the display device is located near a destination computer (host), the two devices are connected by wire to obtain the same display speed as the conventional wired communication speed. When the two devices are located at a distance, they are connected by wireless and perform a variety of operations.

It can be assumed that an apparatus having two connection modes, a wired connection and a wireless connection, includes a base called a cradle, and that the wired connection mode is set by placing a terminal in the cradle and the wireless connection mode is set by removing the terminal from the cradle. Thus, it may be expected that for such an apparatus alternate use of the wired and wireless modes will occur frequently. Thus, when authentication, such as the entry of a password, must be performed each time a connection is made, a common requirement for a network connection, alternate use of the two connection modes will reduce usability. At present, a technique for the constant transfer of a screen image in synchronization with a refresh cycle is employed for a cable connecting a host and a monitor, such as a CRT. For example, for an XGA (Extended Graphics Array) screen size, a per pixel requirement of 16 bits and a refresh rate of 60 Hz, the overall data transmission rate is about 750 Mbps. Since the transfer speed for the average wireless LAN is 11 Mbps at the maximum, adequate data in its original form, as is used for a wired connection, can not be transferred by a wireless connection.

There are methods whereby a screen drawing command (primitive) is transferred instead of a screen image and the command is expanded into an image on a display device, and whereby data is transferred only for a difference on a screen image at a host, and according to these methods, the screen updating response of the display device is satisfactory so long as the drawing frequency used for a screen is low. However, if a large number of drawing commands are executed, an overflow occurs along a transfer path, as in the image transfer method. Further, according to the method whereby data is transferred only for a difference in two successive images at a host, it is difficult to detect a difference in the images. For example, when simply software is employed to acquire a difference, this operation will become overhead.

There is another method whereby many drawing commands are quickly processed at a host and are used for transmitting a snapshot of a screen (or an image difference between snapshots) to a display device at an appropriate interval. However, according to this method, when the drawing frequency is comparatively low, the drawing response is deteriorated when compared with the primitive method.

SUMMARY OF THE INVENTION

To resolve the above technical shortcomings, it is one object of the present invention to automatically make the settings required for a wireless connection, and to smoothly alternate between wired connections and wireless connections.

Another object of the present invention is to ensure a real time process when drawing involving a large amount of data is performed, while maintaining a primitive base response consisting of a screen drawing command. Another object of the present invention is to provide a system in which a wired connection path and a wireless connection path are provided for a terminal, and that smoothly switches between the paths for the wired connection and the wireless connection.

To achieve the above objects, according to the present invention, it is assumed that a one-to-one connection is established in the wired connection mode, along a wired connection path between a processing apparatus and a terminal, that this path can be regarded as a safe communication path, and that the wired connection path and a wireless connection path can be used at the same time, rather than exclusively. Two connection modes, a wired connection mode for communication via a wired connection path and a wireless connection mode for communication via a wireless connection path, are provided for communication between terminals, such as a display device and a processing apparatus. Further, configuration data required for the wireless connection mode is transferred in the wired connection mode.

Specifically, in a system according to the present invention, a processing apparatus comprises: wired communication means, for communicating with a terminal via a wired connection path; and transmitter, for employing, before entering a wireless connection mode, the wired communication means to transmit along a wireless connection path data required for communication with a terminal, or data required for authentication to permit data access.

The system further comprises: detachment means (e.g., a cradle) provided directly or indirectly for the processing apparatus for detaching a terminal. The processing apparatus further includes: detection means, for detecting attachment of the terminal to the detachment means, and switching means, for employing the detection results to alternate between communication along the wired connection path and communication along the wireless connection path. This arrangement is preferable because, for example, the wired connection mode, which maintains the same function, performance and operability as a conventional terminal, and the wireless connection mode, which provides improved usability, can be appropriately switched between.

According to another aspect, a feature of the present invention is the dynamic changing of multiple display data transfer methods in accordance with a specific characteristic value. For example, the display data transfer method is changed in accordance with the property of displayed data. Specifically, according to the present invention, a system comprises: a display device; and a processing apparatus, for communicating with the display device along a wireless connection path, wherein the processing apparatus includes first switch, for transferring image data to the display device in accordance with a drawing instruction protocol for a drawing primitive base consisting of a screen drawing command, second switch, for transmitting image data to the display device in accordance with a protocol whereby delta information for snapshots of a screen image is transmitted, and switching means, for alternately connecting the first switch and the second switch based on a predetermined characteristic value.

The characteristic value comprises at least one of size of data transmitted along a communication path, amount of changed data, the effective bandwidth of a network, and the drawing performance of the display device. Thus, even in the wireless connection mode, in which the data transmission capability is less than in the wired connection mode, a satisfactory display performance can actually be obtained.

Upon receiving a drawing command, the second switch determines whether a screen image should be transmitted based on a predetermined index. When it is ascertained that the screen image should be transmitted, an image based on an area to be calculated is transmitted.

The predetermined index is at least one of a case wherein a value whereby the screen image is changed exceeds a set value, a case wherein a number of drawing commands greater than a set value are processed, a case wherein a set time has elapsed since the transmission of the last image, and a case wherein a transmission request is received from the display device. This arrangement is superior because the image data can be transferred efficiently.

The present invention can also be provided as a host apparatus and a processing apparatus. Specifically, according to the present invention, a processing apparatus (host), having a wired connection mode and a wireless connection mode, for communicating with a terminal comprises: wired communication means, for communicating with a terminal along a wired connection path; wireless communication means, for communicating with the terminal by wireless along a wireless connection path; transmission means, for employing the wired communication means, before communication by the wireless communication means with the terminal is established, to transmit to the terminal data required for communication along the wireless connection path; determination means for determining whether the terminal is disconnected from the wired connection path; and switching means, for changing the wired connection mode to the wireless communication mode, along the wireless connection path, when based on the wireless communication means the determination means ascertains that the terminal is disconnected.

A processing apparatus according to the invention comprises: a CPU; a graphics adaptor, for generating image data based on a drawing command; a frame memory, for expanding image data generated by the graphics adaptor; and a wireless communication device, for transmitting drawing data, in a transfer mode, to a display device using a drawing primitive, wherein the CPU employs a predetermined index to determine whether image data should be transmitted, calculates an area to be transmitted and reads image data from a frame memory, and wherein, instead of a transfer mode using a drawing primitive, the wireless communication device transmits to the display device, along a wireless connection path, image data that is read.

The CPU calculates an area to be transmitted based on a change in the image data expanded to the frame memory.

Therefore, for example, even when the data size is reduced compared with when all the image data are transmitted, a satisfactory display performance can be practically obtained.

Furthermore, the present invention can be provided as a terminal, such as a display device. Specifically, according to the present invention, a wireless connection terminal for communicating with a processing apparatus along a wired connection path and a wireless connection path comprises: wired communication means, for communicating with the processing apparatus along the wired connection path; and wireless communication means, for communicating with the processing apparatus along the wireless connection path, wherein, before initiating communication along the wireless connection path, the wired communication means receives, along the wired connection path, data required for communication along the wireless connection path, or data required for authentication for communication along the wireless connection path.

The wireless communication means transfers to the processing apparatus, by wireless, an authentication request that is received from the wired communication means and that is based on data required for authentication.

The wireless communication means further includes detection means for detecting the disconnection of the terminal from the wired connection path, wherein, based on the detection results obtained by the detection means, data communication by the wired communication means is halted and communication by the wireless communication means is initiated.

In addition, the wireless communication means further comprises: expansion means, such as a graphics adaptor, for expanding an image in a frame memory based on data received along the wireless connection path; and display means, such as a display panel, for reading and displaying the image expanded in the frame memory.

According to another aspect of the present invention, a data transfer method for performing communication between a processing apparatus and a terminal along a wired path and a wireless path comprises the steps of: determining whether the terminal is connected to the wired path; and when the terminal is connected to the wired path, transferring in advance, along the wired path, data required for communication along the wireless path, and performing authentication required for wireless connection.

The wired connection cable and the wireless link can be used at the same time, rather than exclusively. Based on this idea, a session ID is transmitted by the processing apparatus, via a wired path, to the terminal, then the session ID is transmitted by the terminal, via a wireless path, back to the processing apparatus.

According to the invention, a data transfer method for providing communication, along a wireless path, between a display device and a processing apparatus comprises the steps of: detecting a predetermined characteristic value for communication along the wireless path; and alternately employing a first transfer method based on the detected characteristic value, transmitting image data to the display device in accordance with a drawing instruction protocol for a drawing primitive base, consisting of a screen drawing command, and a second transfer method, for transmitting image data to the display device according to a protocol whereby image data are transferred as delta information for snapshots of a screen image.

These configurations of the invention can be provided as programs that permit a computer to execute the various functions, and the computer programs can be provided, via a network, to the computer, which is a processing apparatus, by a program transmission apparatus at a remote location. The program transmission apparatus can comprise: storage means, such as a CD-ROM, a DVD, a memory or a hard disk, for storing the programs; and transmission means, for reading the programs from the storage means and for transmitting the programs, via a connector and a network such as the Internet or a LAN, to the program execution apparatus.

The computer programs can also be provided directly using a storage medium, such as a CD-ROM or a DVD. For this arrangement, a computer, such as a PC, in which a program is to be installed need only include a storage medium reading device (a CD-ROM drive or a DVD drive).

DESCRIPTION OF THE SYMBOLS

Figure 1:
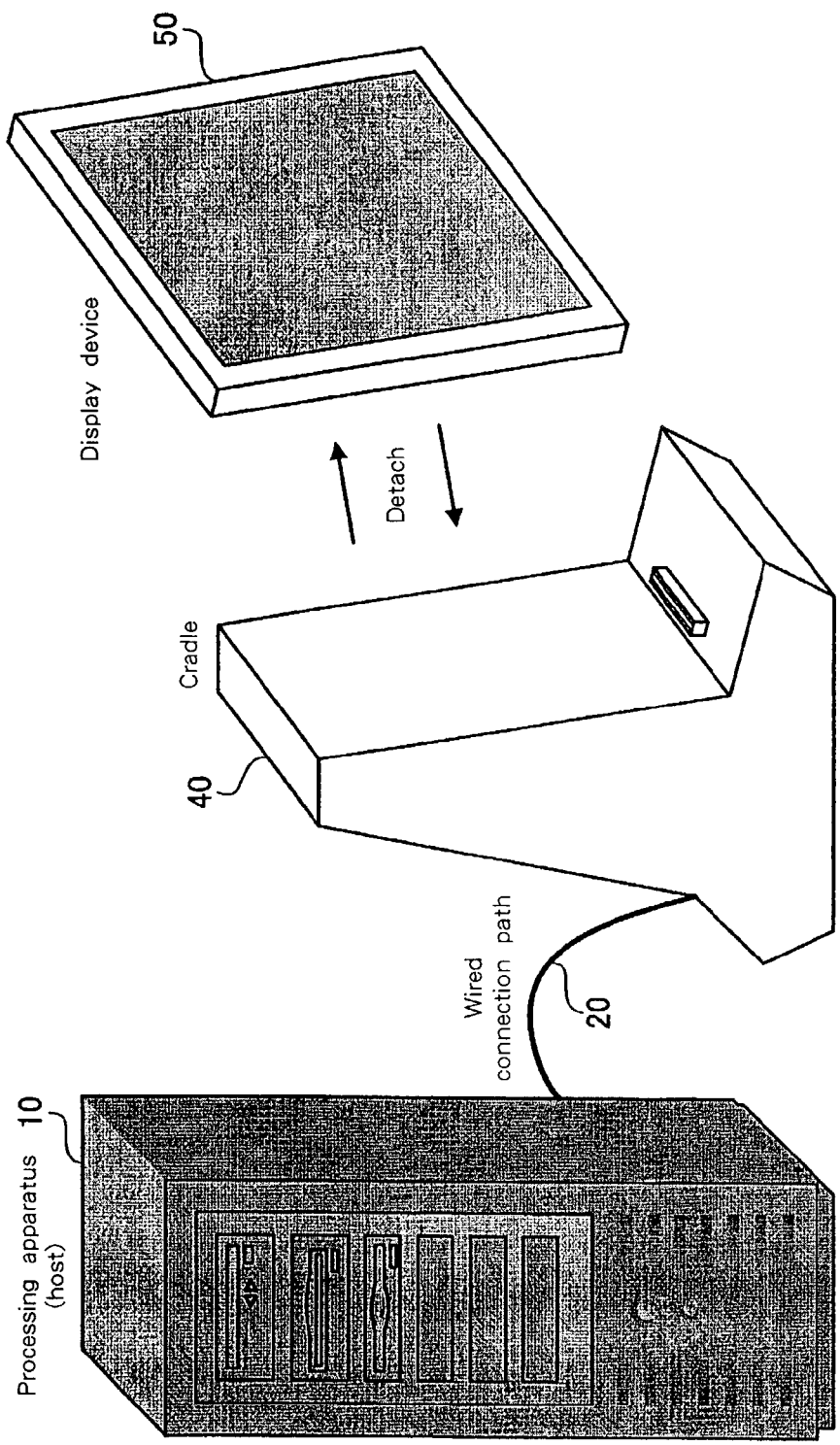
FIG. 1 is a schematic diagram for explaining the configuration of a system according to the present invention.

10: Processing apparatus (host)
11: CPU
12: Main memory
13: Graphics adaptor
14: Frame memory
15: Wired communication device
16: Wireless communication device
20: Wired connection path
21: Wired data transfer line
22: Wired image transfer line
30: Wireless connection path
40: Cradle
41: Connector
42: Detachment detector
50: Display device
51: Connector
52: Wired communication device
53: Wireless communication device
54: Graphics adaptor
55: Frame memory
56: Display panel
57: Input device
58: Detachment detector

DETAILED DESCRIPTION OF THE INVENTION

FIG. 1 is a schematic diagram for explaining the configuration of a system according to one embodiment. The system for this embodiment comprises: a processing apparatus (host) 10, for performing image processing and outputting image data; a cradle 40, electrically connected to the processing apparatus 10 along a wired connection path (wired connection line) 20; and a display device 50, detachably mounted on the cradle 40, that serves as a wireless connection terminal.

The cradle 40 is a separate, upright docking station. However, the processing apparatus 10 and the cradle 40 may be integrally formed, as a single unit in which the wired connection path 20 is internally provided, and the display device 50 may be detachably mounted directly on the processing apparatus 10. Specifically, when, as is shown in FIG. 1, the wired connection path 20 is exposed, outside the processing apparatus 10, and the cradle 40 is located separate from the processing apparatus 10, the cradle 40 is "indirectly" provided for the processing apparatus 10. When the processing apparatus 10 and the cradle 40 are integrally formed, constituting a single unit, the two are "directly" provided for each other.

Figure 2:
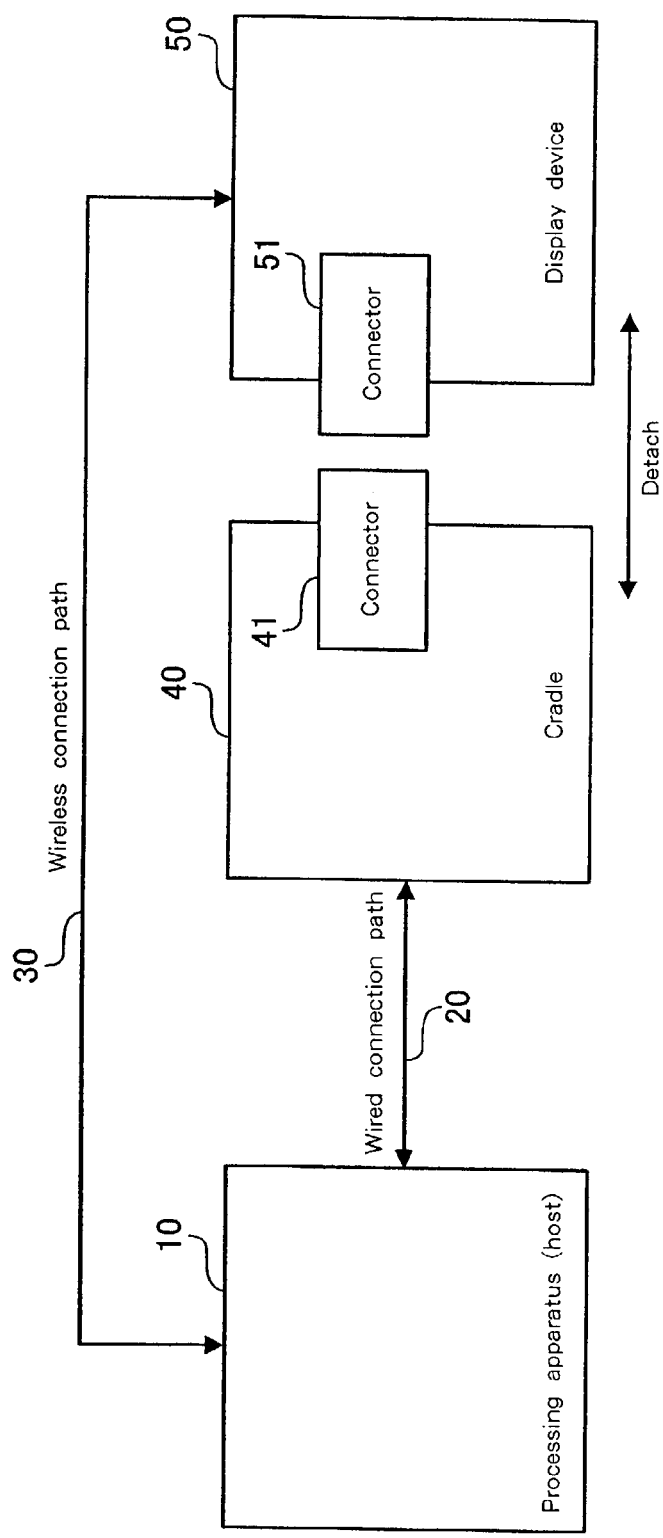
FIG. 2 is a block diagram showing the general configuration of the system according to the embodiment.

FIG. 2 is a block diagram showing the general configuration of the system of the embodiment. The cradle 40 includes a connector 41 and the display device 50 includes a connector 51. By attaching the connector 51 to the connector 41, the display device 50 is physically coupled with the cradle 40 and is electrically connected thereto. As a result, the processing apparatus 10 and the display device 50 are connected along the wired connection path 20. When the display device 50 is detached from the cradle 40, the display device is locally connected to the processing apparatus 10 along a wireless connection path 30, so that radio image data and radio data can be exchanged.

Figure 3:
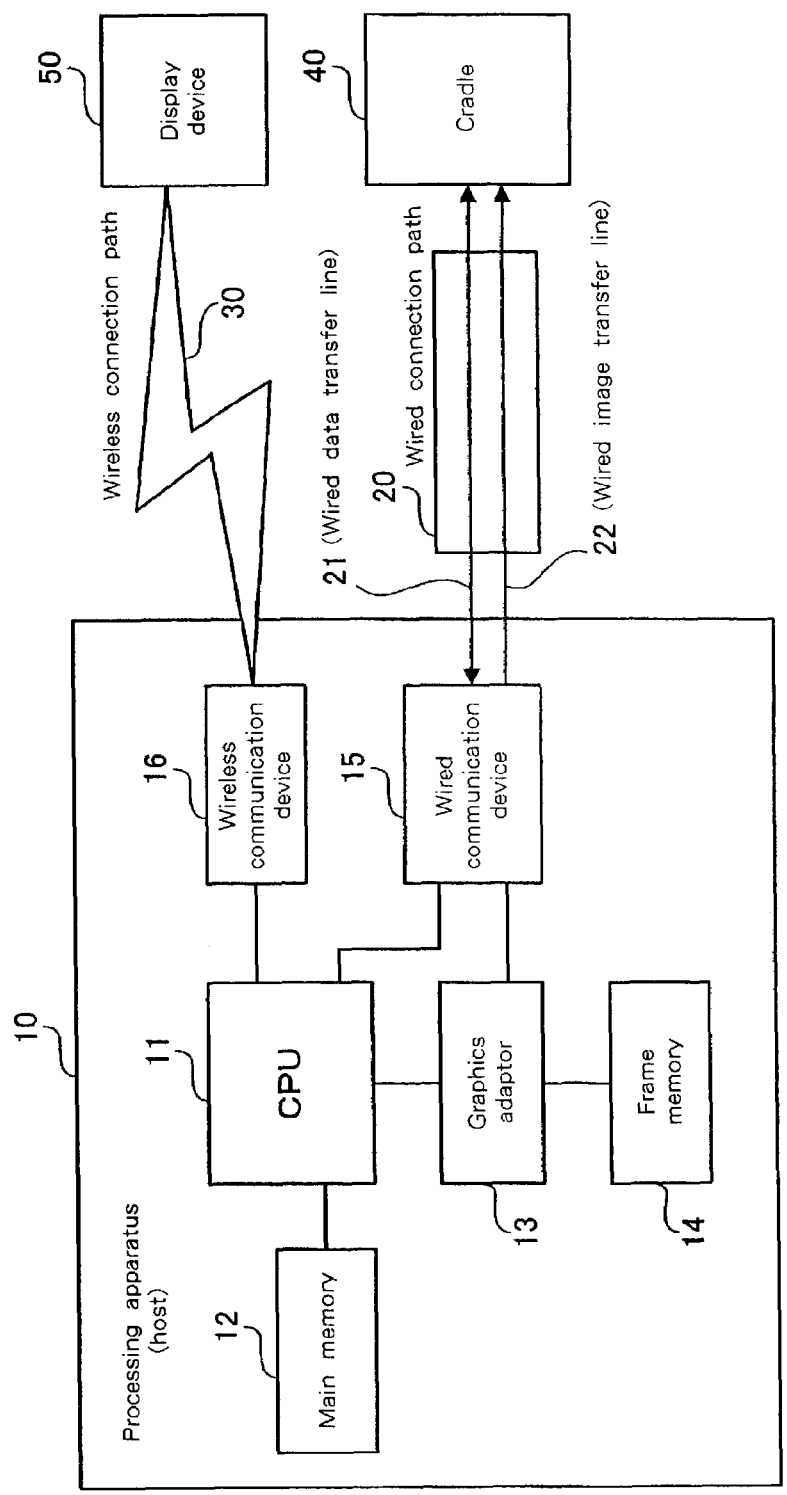
FIG. 3 is a more detailed block diagram showing the system configuration according to the embodiment.

FIG. 3 is a detailed block diagram showing the system configuration according to the embodiment. The wired connection path 20 is composed of a wired data transfer line 21 and a wired image transfer line 22. The wired data transfer line 21 is used to bi-directionally transmit data other than image data between the processing apparatus 10 and the cradle 40. The wired image transfer line 22 is used to receive image data from the processing apparatus 10 and to transfer the image data to the cradle 40. The wired connection path 20 is, for example, a display cable combination using a coaxial cable and a USB (Universal Serial Bus), or a DVI (Digital Visual Interface) cable using a twisted line. Since the common video connection cable has a bidirectional communication path, in addition to a video signal line, it can be used as a control line. And for analogue RGB, for example, when a USB cable is used with a video cable it can also be used as a control line.

The processing apparatus 10 comprises: a CPU 11, for controlling the entire apparatus; a main memory 12, used for the operation of the CPU 11; a graphics adaptor 13, for generating image data; a frame memory 14, for expanding the image data generated by the graphics adaptor 13; a wired communication device 15, for providing communication along the wired connection path 20; and a wireless communication device 16, for exchanging data along the wireless connection path 30. In this embodiment, a user installs, in advance, display device control software in the processing apparatus 10, which is the host. The display device control software may be installed in advance at the time of purchase of the processing apparatus 10, or may be provided on a storage medium, such as a CD-ROM, or downloaded along a network, such as the Internet. The display device control software is divided into a portion for controlling the connection of the terminal (display device 50) and a portion for controlling drawing data in a wireless mode.

The display device control software performs a monitoring function to determine whether the terminal (display device 50) is connected to the processing apparatus 10, the host. When the display device 50 is connected, the display device control software is placed in the wired connection mode, whereafter it transmits a video signal to the display device 50 along the wired image transfer line 22. Further, the display device control software transmits various data required for a wireless connection to the display device 50. When necessary, information required for authentication is transmitted to the display device 50 by referring to the identifier of the connected display device 50. When the display device 50 is detached from the cradle 40, the display device control software is shifted to the wireless connection mode and transmits screen data to the display device 50 along the wireless connection path 30, which is a wireless link.

In the wired connection mode for communication along the wired connection path 20, the CPU 11 performs a specific process using a command or data in the main memory 12. As a result, the CPU 11 transmits the contents to be displayed to the graphics adaptor 13 as a drawing primitive, which is a screen drawing command, instead of a screen image, such as a rectangle or a line segment. The graphics adaptor 13 generates image data in the frame memory 14 in accordance with the contents of the received drawing primitive, and periodically reads the generated image data and transmits it to the wired communication device 15. Thereafter, the wired communication device 15 transfers the image data received from the graphics adaptor 13 to the wired image transfer line 22.

In the wireless connection mode for communication along the wireless connection path 30, as well as in the wired connection mode, either the CPU 11 generates image data in the frame memory 14, which it thereafter transmits, along the wireless communication device 16, to the display device 50, or it performs a specific process using a command and data in the main memory 12 and converts the contents to be displayed into a drawing primitive form that it transmits, along the wireless communication device 16, to the display device 50.

The wireless communication device 16 exchanges data with the wireless communication device (which will be described later) of the display device 50. An example wireless communication device 16 is a wireless LAN, constructed in accordance with the IEEE 802.11 standard, or Bluetooth. Also, along the wired data transfer line 21, data is exchanged by the processing apparatus 10 and the display device 50. An example wired data transfer line 21 is a DDC (Display Data Channel), or USB.

Figure 4:
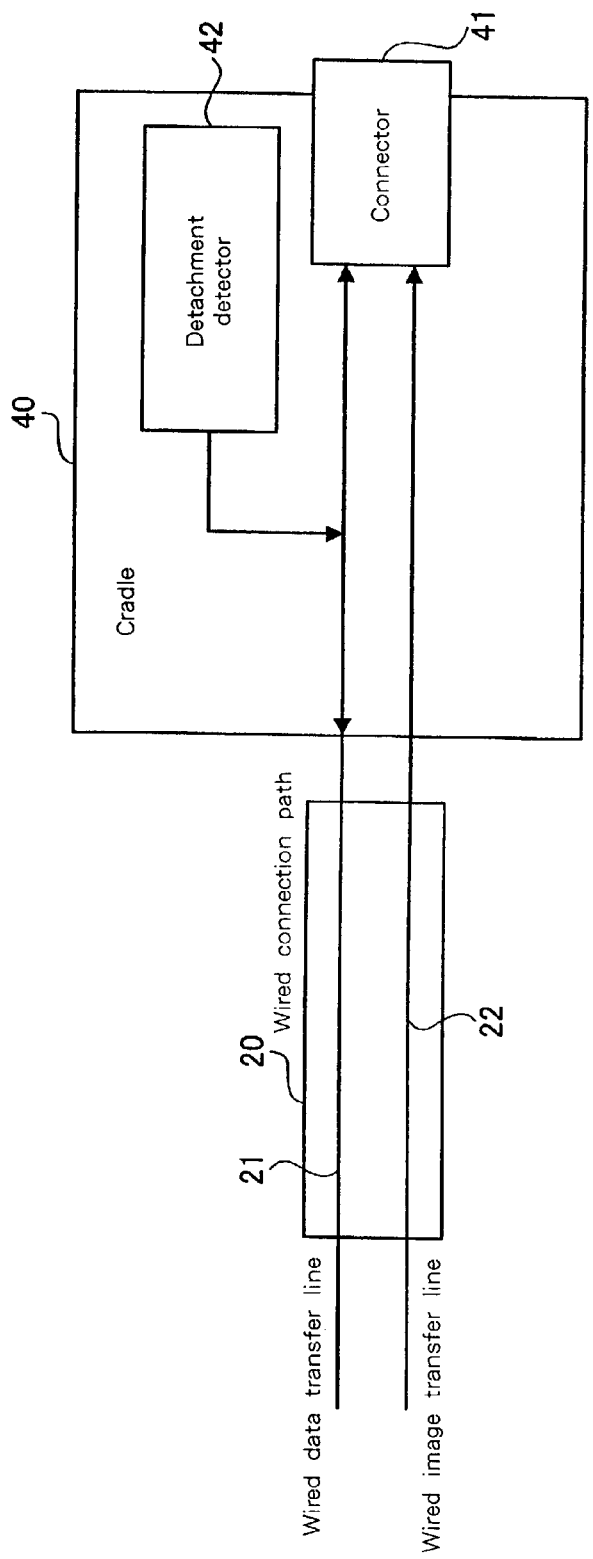
FIG. 4 is a block diagram for explaining a cradle according to the embodiment.

FIG. 4 is a block diagram for explaining the cradle 40. The cradle 40 includes the connector 41 and a detachment detector 42. The cradle 40 receives signals along the wired data transfer line 21 and the wired image transfer line 22, and transmits the signals to the display device 50 via the connector 41. The detachment detector 42 electrically detects the detachment of the display device 50 and transmits this information, along the wired data transfer line 21, to the processing apparatus 10. For the detachment detection performed by the detachment detector 42, a mechanical switch may be used or a signal line along which information is exchanged, via the connector 41, with the display device 50 may be monitored to detect a signal level.

The detachment detector 42 can be provided inside the processing apparatus 10, instead of inside the cradle 40. In this case, the CPU 11 of the processing apparatus 10 need only periodically exchange information with the display device 50, via the wired data transfer line 21, to determine whether the wired image transfer line 22 is connected, since the exchange of data can at least be confirmed at constant time intervals.

Figure 5:
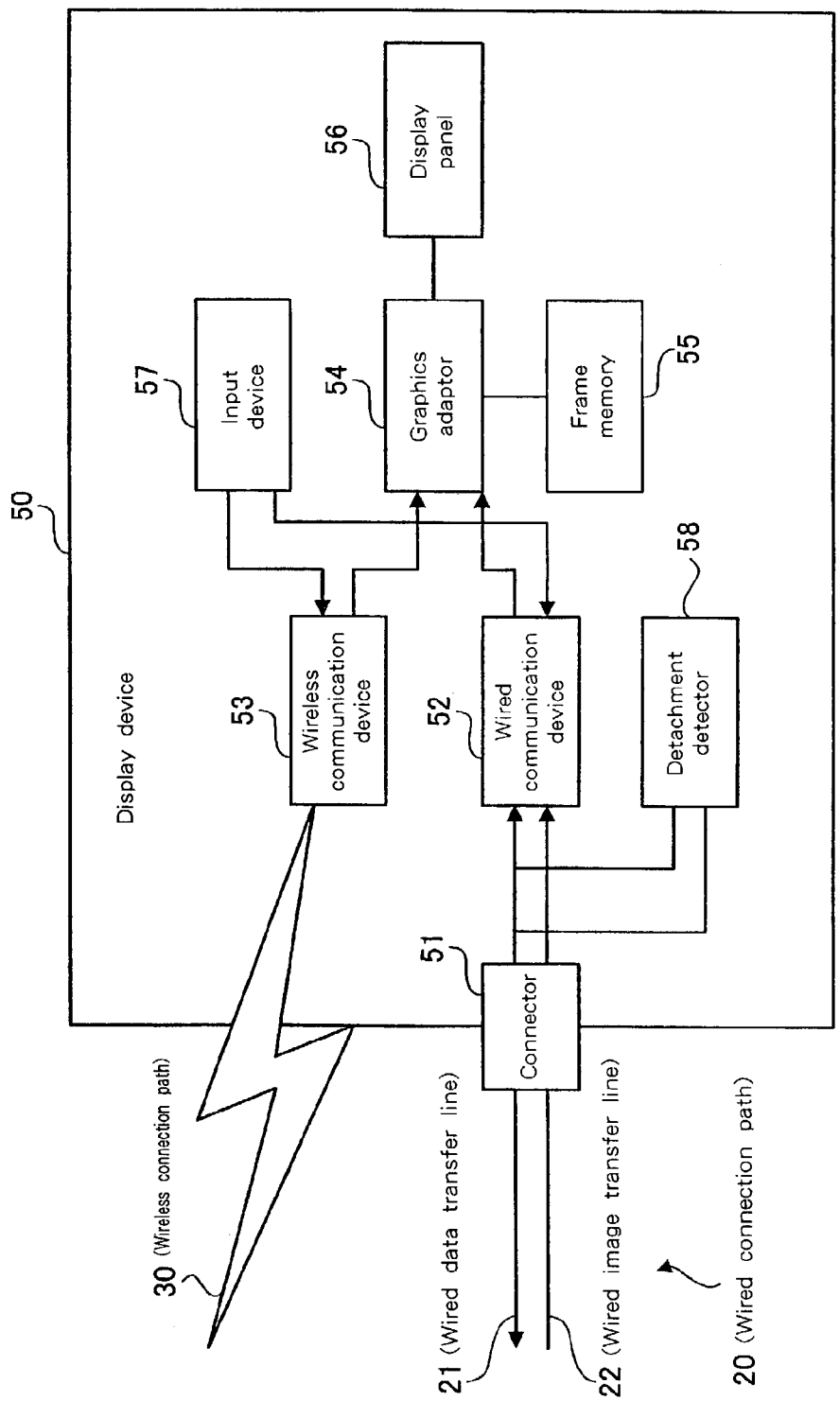
FIG. 5 is a detailed block diagram showing a display device according to the embodiment.

FIG. 5 is a detailed block diagram showing the configuration of the display device 50. The display device 50 comprises: the connector 51; a wired communication device 52, for exchanging information via the wired connection path 20; a wireless communication device 53, for exchanging information via the wireless connection path 30; a graphics adaptor 54 for generating image data; a frame memory 55, for expanding the image data generated by the graphics adaptor 54; a display panel 56, for outputting image data input by a user; an input device 57, for receiving an entry from a user; and a detachment detector 58, for detecting a connection with the wired connection path 20.

The display device 50 receives image data and drawing primitives from the processing apparatus 10, along the wired connection path 20 and through the connector 51 and the wired communication device 52, or along the wireless connection path 30 through the wireless communication device 53. The image data and drawing primitive are then transmitted to the graphics adaptor 54. The graphics adaptor 54 generates complete image data in the frame memory 55 and the generated image data is displayed on the display panel 56.

The input device 57 receives an entry from a user of the display device 50, and transmits this to the processing apparatus 10 along the wired data transfer line 21 or along the wireless connection path 30. An example input device 57 can be a touch panel, a switch, a trackball, a track point, a microphone, a camera or a fingerprint recognition unit. The detachment detector 58, as well as the detachment detector 42 of the cradle 40, electrically detects the attachment of the display device 50 to the cradle 40. For this detachment detection, a mechanical switch may be used or a signal across the connector 51 may be monitored to detect a change in a signal level.

The operation of the system according to the embodiment will now be described.

Figure 6:
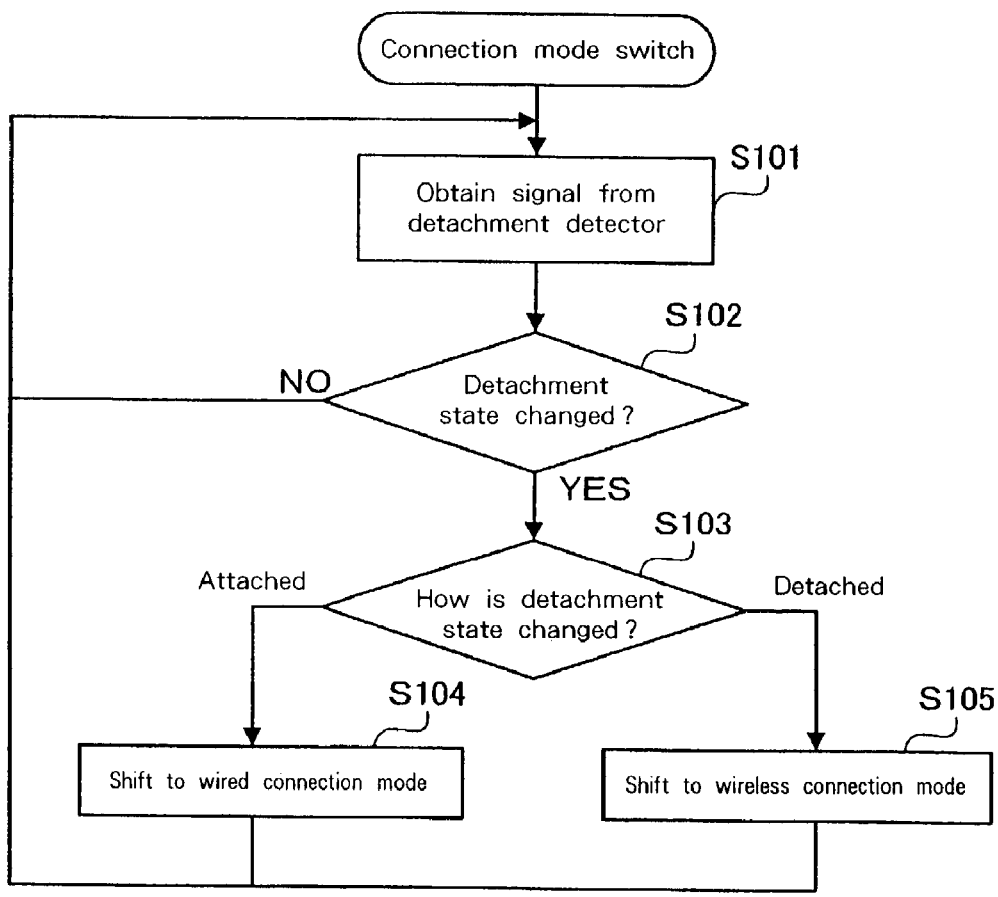
FIG. 6 is a flowchart showing the processing performed by a processing apparatus when switching connection modes.

FIG. 6 is a flowchart showing the connection mode switching operation of the processing apparatus 10. During this process, the wired connection mode and the wireless connection mode are switched. The CPU 11 of the processing apparatus 10 receives a signal from the detachment detector 42 in the cradle 40 via the wired data transfer line 21 (step 101), and determines whether the detachment state of the display device 50 has changed (step 102). When the detachment state is unchanged, program control returns to step 101. When the detachment state has changed, the state following the change is examined (step 103). When the display device 50 is mounted, the connection mode is shifted to the wired connection mode (step 104), and program control returns to step 101. When the display device 50 is disconnected (detached), the connection mode is shifted to the wireless connection mode (step 105) and program control returns to step 101.

Several methods for detecting the detachment state of the display device 50 are provided for the detachment detector 42 of the cradle 40. For example, the wired image transfer line 22 may be monitored to electrically detect a change in a signal level due to the connection of the end terminal of the signal line, so that it is ascertained that the display device 50 is mounted. Or, a mechanical switch may be provided for the cradle 40 to detect the physical presence of the display device 50 on the cradle 40. As an additional method, data may be exchanged periodically with the display device 50 through the wired data transfer line 21, and when a data exchange covering a constant period of time can be confirmed, it is ascertained that a connection has been established.

Figure 7:
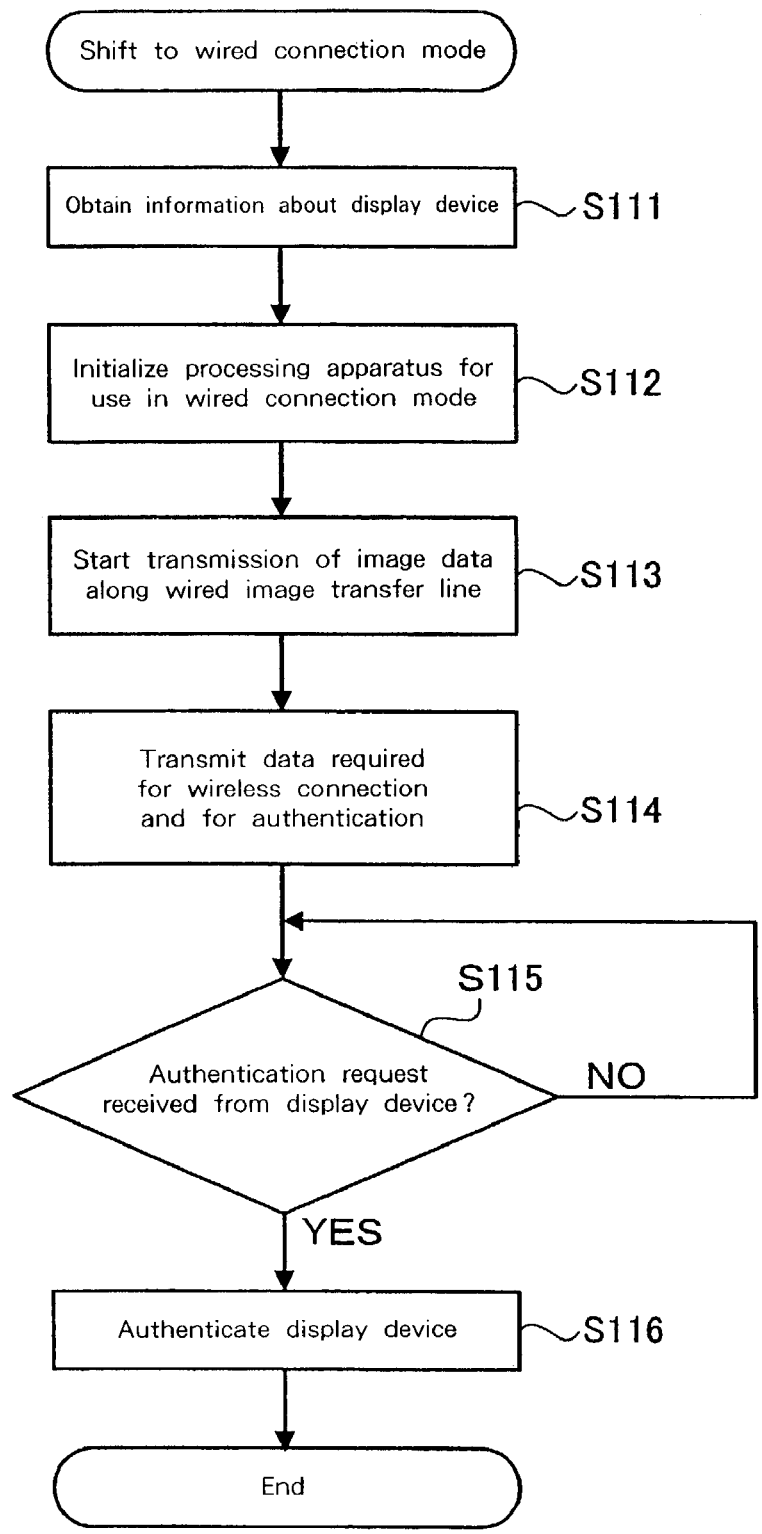
FIG. 7 is a flowchart for explaining the process performed by the processing apparatus when shifting to a wired connection mode.

FIG. 7 is a flowchart for explaining the shifting of the processing apparatus 10 to the wired connection mode. When it is determined that the connection to the wired image transfer line 22 has been established, the processing apparatus 10 is shifted to the wired connection mode. First, the CPU 11 obtains information concerning the display device 50 along the wired data transfer line 21 (step 111). The obtained information is the resolution of the display device 50 and the maximum screen refresh frequency. The CPU 11 employs the obtained information to initialize components of the processing apparatus 10 in the wired connection mode, such as the initialization of the graphics adaptor 13 (step 112). Thus, the image data can be transmitted at a resolution and a transfer speed that satisfy the requirements of the display device 50. The processing apparatus 10 then begins the transmission of image data via the wired image transfer line 22 (step 113).

Next, the CPU 11 transmits the information required for a wireless connection, as well as the information for the authentication to the display device 50 via the wired data transfer line 21 (step 114). The CPU 11 then waits for the arrival of an authentication request transmitted by the display device 50 via the wireless communication device 16 (step 115). Based on the received authentication request, the CPU 11 authenticates that the display device 50 (step 116) is ready to be shifted to the wireless connection mode. As is described above, for common wireless communication, the information required for a wireless connection is exchanged in advance via the wireless connection path 30. However, in this embodiment, the information for the wireless connection and the information for authentication are exchanged in advance using the wired connection path 20. That is, in this embodiment, both the wired connection mode and the wireless connection mode are prepared, and when a wired connection has been established, the information required for a wireless connection is transmitted in advance to the display device 50 by wire. Therefore, in the wired connection mode, the authentication required for a wireless connection can be performed.

Figure 8:
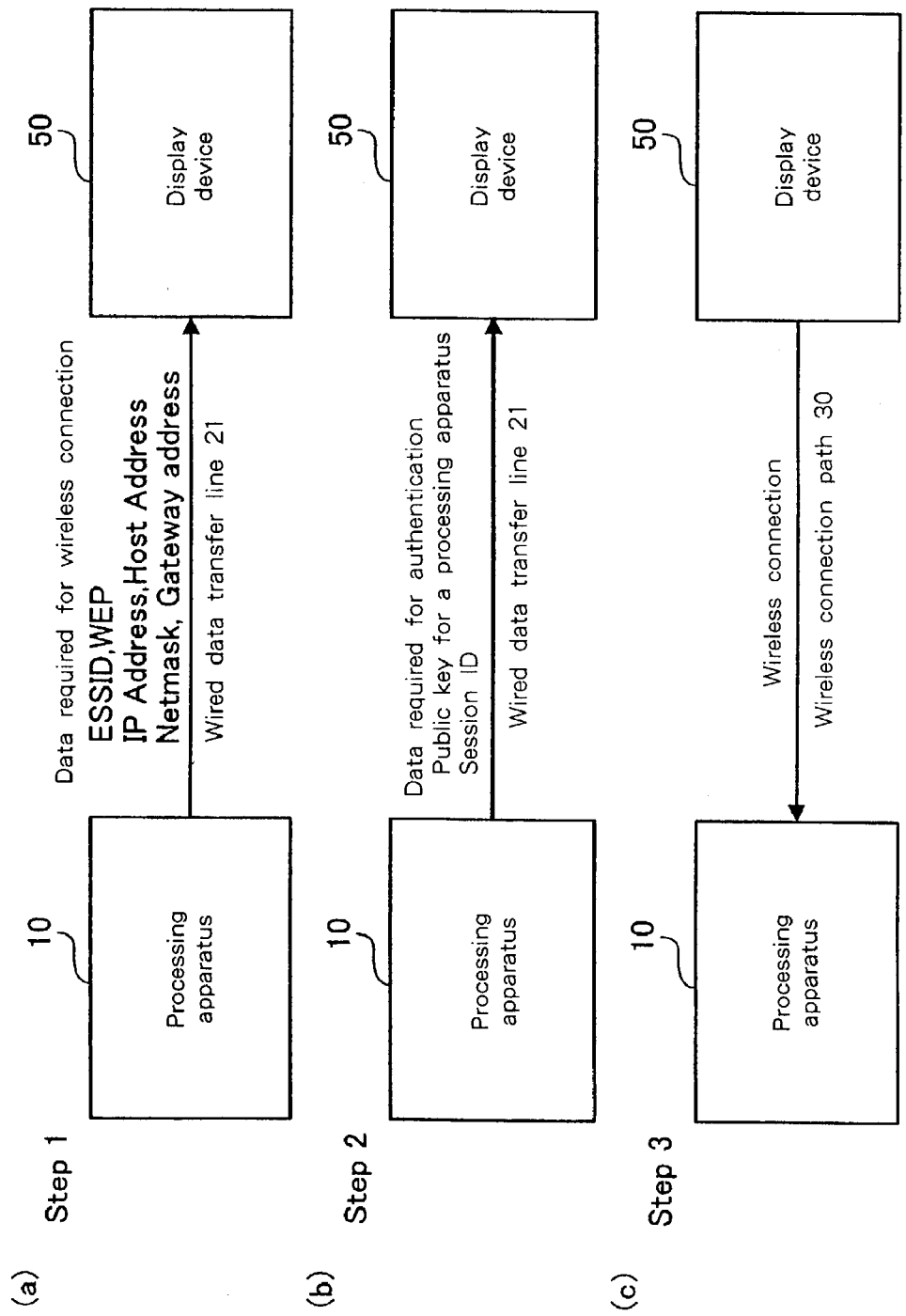
FIGS. 8A to 8C are diagrams showing the data required for a wireless connection and for authentication and the data exchange process.

FIGS. 8A to 8C are diagrams showing the data required for the wireless connection and the authentication and for the data exchange process. At step 1 in FIG. 8A, necessary information for the wireless connection is transmitted by the processing apparatus 10 to the display device 50 via the wired data transfer line 21 of the wired connection path 20. Assuming that the IEEE 802.11 wireless standards and the TCP/IP protocols are used for a wireless connection, the information required for the wireless connection is information that is needed for the connection of a wireless link layer, such as ESSID (Extended Service Set Identity), which is the basic IEEE 802.11 specification, or WEP (Wired Equivalent Privacy) for determining the presence of an error or alteration. The information can also be information required for the connection of a network layer, such as an IP address (Internet Protocol address) or a gateway address, or a Netmask used to sort IP addresses, or information, such as a DHCP (Dynamic Host Configuration Protocol) for obtaining the above information. Further, a host address that serves as an identifier for the host (processing apparatus 10) can also be included as information vital to the wireless connection.

At step 1 in FIG. 8A, the information used for the wireless connection is transmitted to the display device 50 not only unconditionally, but also in accordance with a specific condition. For example, the ID of each display device 50 for which a connection should be permitted may be stored in advance in the processing apparatus 10. Then, the ID of the display device 50 is examined at the time each wired connection is made, and only when a connection is permitted is the information required for the wireless connection transmitted.

At step 2 in FIG. 8B, information required for authentication is transmitted via the wired data transfer line 21 to permit the information to be accessed in the wireless connection mode. The data to be supplied for the authentication is the public key of the processing apparatus 10 and a session ID.

At step 3 in FIG. 8C, a wireless connection is established between the display device 50 and the processing apparatus 10, and the display device 50 transmits an authentication request to the processing apparatus 10.

The display device 50 then employs the data received at step 1 in FIG. 8A to initialize the wireless interface. Following this, the session ID received at step 2 in FIG. 8B is encrypted using the public key of the processing apparatus 10, and the encrypted session ID is transmitted along the wireless connection path 30. It should be noted that the specified encryption method is not requisite, and that another encryption method may be employed. The authentication request can be performed through wireless connection, regardless of whether the display device 50 is connected to the wired connection path 20. This arrangement is superior because a shift to the wireless communication can be easily effected so long as the authentication process can be completed before the display device 50 is removed from the cradle 40.

Figure 9:
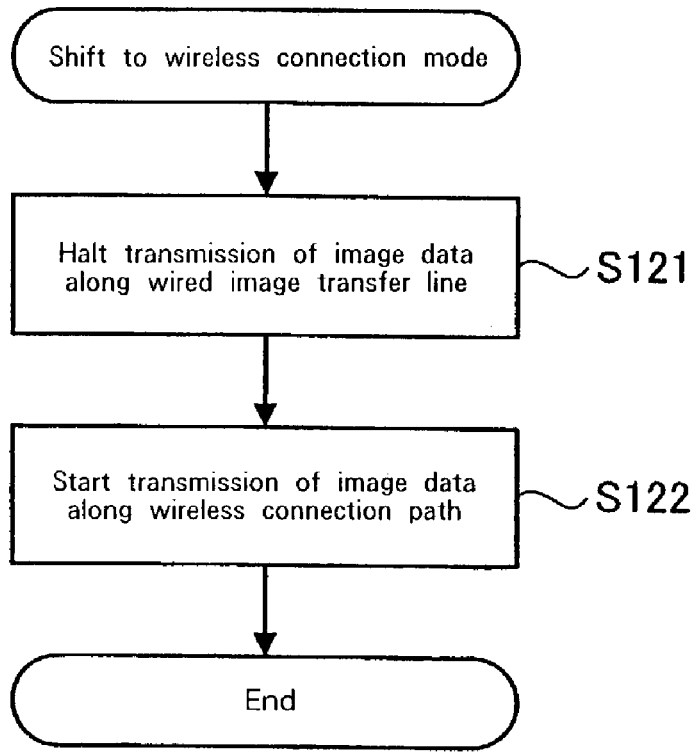
FIG. 9 is a flowchart showing the process performed by a processing apparatus when shifting to a wireless connection mode.

FIG. 9 is a flowchart showing the processing performed by the processing apparatus 10 when shifting the mode to the wireless connection mode. The CPU 11 of the processing apparatus 10 is shifted to the wireless connection mode when the detachment detector 42 of the cradle 40 determines that the display device 50 has been detached from the cradle 40. In the wireless connection mode, the CPU 11 halts the transmission of image data through the wired image transfer line 22 (step 121), and then initiates the transmission of image data along the wireless connection path 30 (step 122). At this time, since the display device 50 has already been authenticated, communication along the wireless connection path 30 is immediately enabled. That is, in this embodiment, the actual mode change by the user is not also required for the shift from the wired connection to the wireless connection, and the display device 50, which is a wireless connection terminal, need only be detached from the cable (cradle 40) to immediately enter the wireless connection mode.

Figure 10:
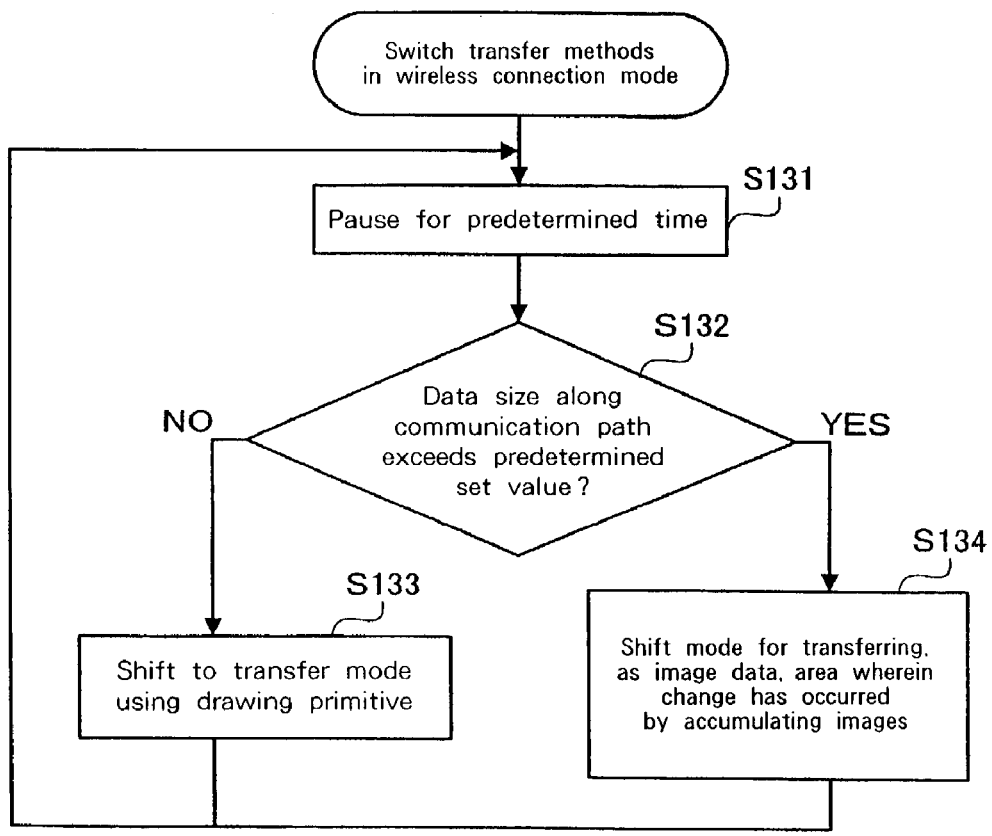
FIG. 10 is a flowchart showing the process performed by the processing apparatus to change a transfer method in the wireless connection mode.

FIG. 10 is a flowchart showing the processing performed by the processing apparatus 10 to switch the transfer method in the wireless connection mode. In the wireless connection mode, the image data is transmitted by the processing apparatus 10 along the wireless connection path 30 to the display device 50. The method used for transmitting the data is changed depending on the contents to be displayed, so that an efficient transmission is enabled. To change the transfer method in the wireless connection mode, following the elapse of a specific period of time (step 131), the CPU 11 monitors the data size along the communication path, and determines whether the data size exceeds a set predetermined value (step 132). The CPU 11 pauses for a predetermined period of time at step 131 in order to perform smoothing (averaging), while taking into account the fact that the screen data may be temporarily changed.

At step 132, the amount of data transmitted during a predetermined period is determined. And when, at step 132, the data size is smaller than a predetermined set value, the mode is shifted to a transfer mode using the drawing primitive (step 133). When the data size exceeds the predetermined set value, the mode is shifted to a mode for transferring, as image data, the area wherein change has occurred due to the accumulation of an image (step 134). That is, in the embodiment, two transfer methods are prepared: a transmission function according to a drawing instruction protocol on a drawing primitive base, and a function for accumulating drawing images in the screen buffer of a host and transmitting snapshots of the screen to the terminal (display device 50) at an appropriate timing.

At step 132, the data size on the communication path is employed as the index (characteristic value) for switching the transfer method. However, the transfer method can be dynamically changed by using another index (characteristic value). For example, the following replacement means can be employed.

- The amount of drawing data using the "drawing primitive" protocol. More specifically, the ratio of the size of the sequence on the drawing primitive base to the number of screen images generated during in the drawing process.
- The effective bandwidth of a network
- The drawing performance of the display device 50
- The value of the change in the data size along the communication path.

Figure 11:
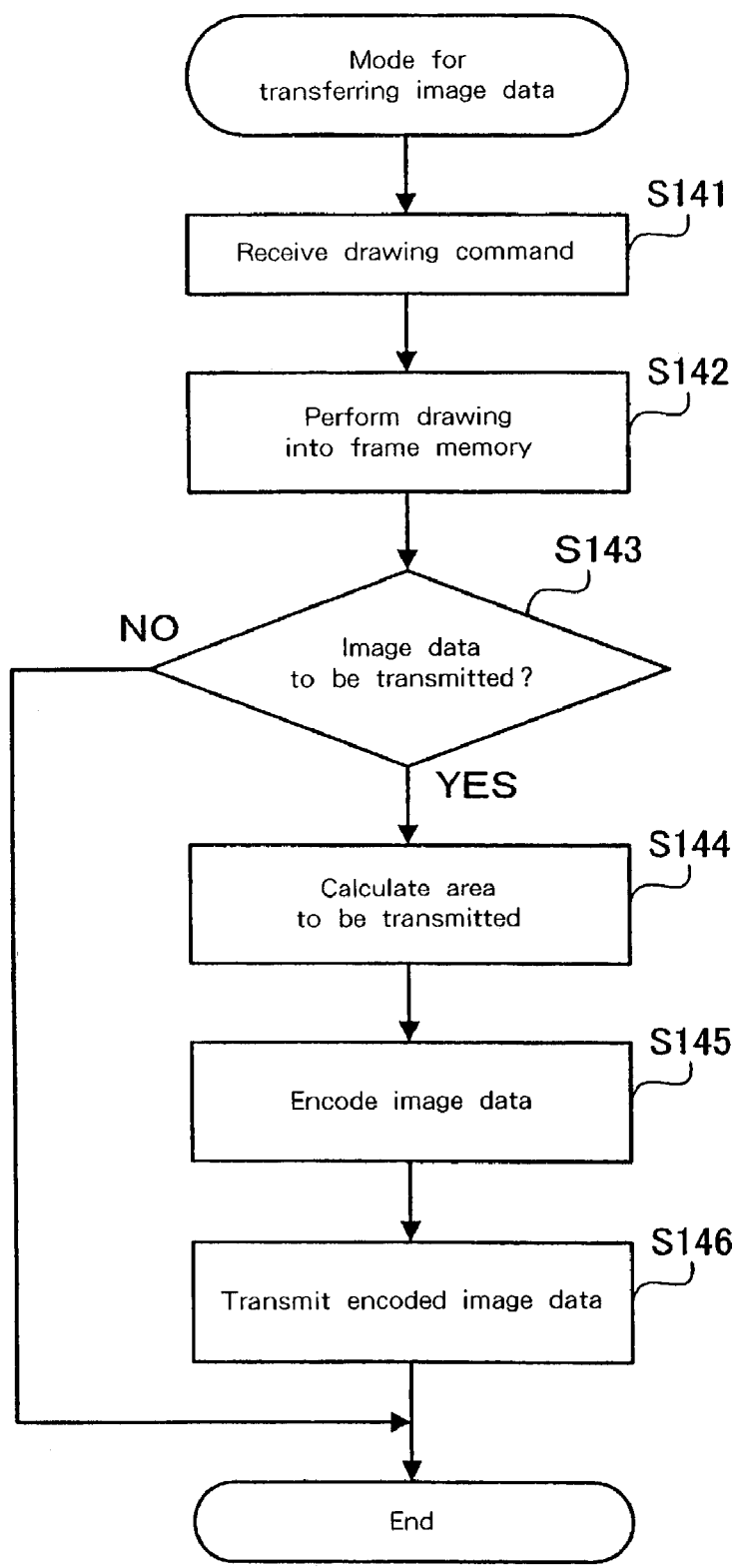
FIG. 11 is a flowchart showing the process in the mode wherein data are transmitted as image data used in the wireless connection mode.

FIG. 11 is a flowchart showing the processing at step 134 in FIG. 10 for the mode for transmitting image data using a wireless connection. The CPU 11 of the processing apparatus 10 receives a drawing command (step 141), and uses the graphics adaptor 13 to draw the image data into the frame memory 14 (step 142). Then, the CPU 11 determines whether the screen image should be transmitted (step 143). The index used as a determination reference can be whether the value of the change in data on the screen exceeds the predetermined set value. Further, the CPU 11 can determine whether the number of drawing commands processed exceeds a designated count, whether a predetermined time has elapsed since the last screen image was received, and whether a transmission request is received from the display device 50. When, for example, one or more of these conditions are established, the CPU 11 calculates the area wherein a change has occurred, and obtains an area to be transmitted (step 144). The CPU 11 reads the pertinent image from the frame memory 14 and encodes the image data so acquired (step 145). Thereafter, the encoded image data are transmitted to the wireless communication device 16 and are then transmitted along the wireless communication path 30 to the display device 50 (step 146). The processing is thereafter terminated. When it is ascertained at step 143 that the image data should not be transmitted, the process is terminated; no further processing is performed.

Figure 12:
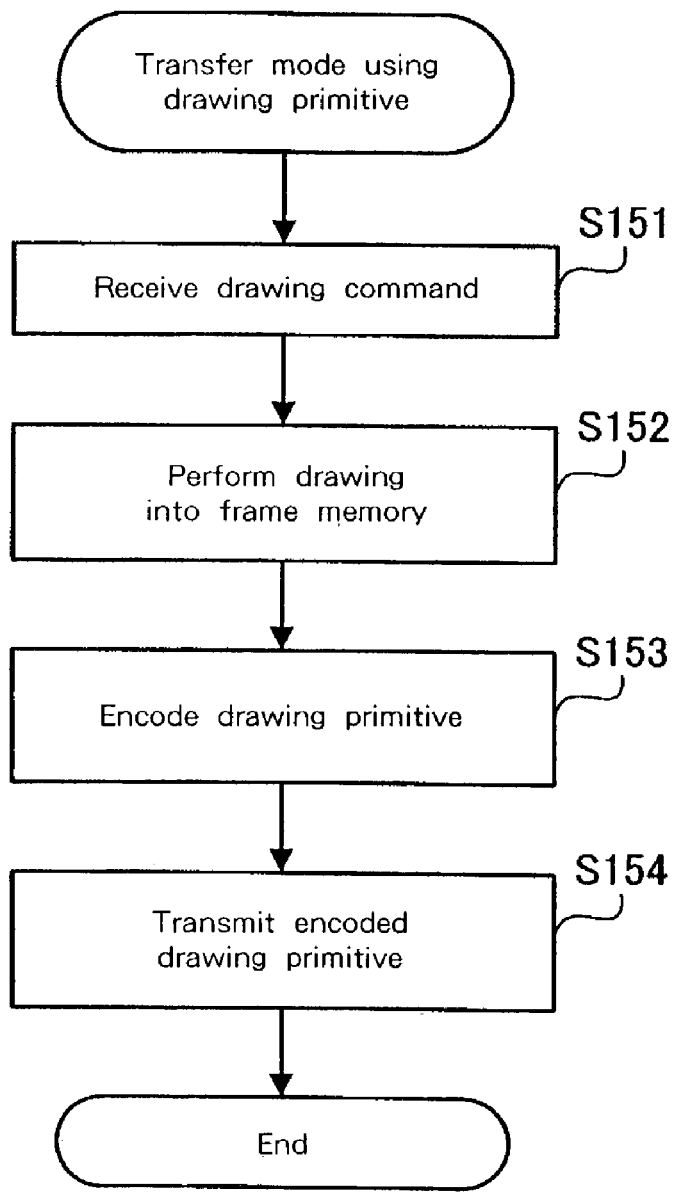
FIG. 12 is a flowchart showing the processing in a transfer mode using a drawing primitive.

FIG. 12 is a flowchart showing the process at step 133 in FIG. 10 in the transfer mode using the drawing primitive. The CPU 11 of the processing apparatus 10 receives a drawing command (step 151), and uses the graphics adaptor 13 to draw an image into the frame memory 14 (step 152). Then, the CPU 11 converts the received drawing command into a drawing primitive, which it encodes (step 153). Thereafter, the encoded drawing primitive is transmitted to the wireless communication device 16, and is then transmitted along the wireless connection path 30 to the display device 50 (step 154). The processing is thereafter terminated.

In this embodiment, the mode for the transmission of a drawing primitive and the mode for the transmission of a changed area as image data are changed in accordance with the data size along a communication path. That is, when the predetermined value at step 132 is exceeded, the transfer mode using the drawing primitive is shifted to the mode for the transmission of image data. With this arrangement, when the area where the image is changed is to be transmitted as image data, a wasted data transfer, such as painting the same area with the same color twice, can be prevented. Further, at the sacrifice of latency, the transfer interval is delayed by accumulating the changed portions in the processing apparatus 10, so that the volume of data along the wireless connection path 30 can be adjusted.

An explanation will now be given for the processing performed by the display device 50, a wireless connection terminal.

Figure 13:
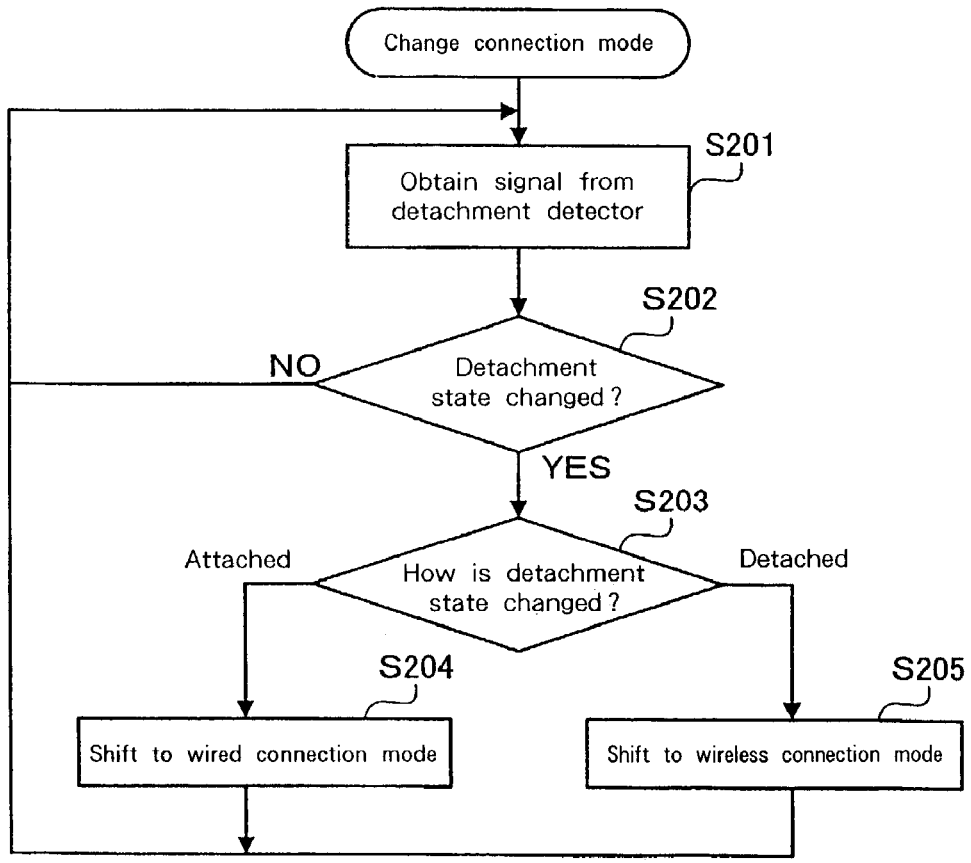
FIG. 13 is a flowchart showing the connection mode switching process performed by the display device.

FIG. 13 is a flowchart showing the connection mode switching process performed by the display device 50. To change the connection mode, the display device 50 obtains from the detachment detector 58 a signal indicating the detachment state (step 201), and determines whether the detachment state has changed (step 202). When the detachment state has not changed, program control returns to step 201, where a signal from the detachment detector 58 is waited for. When the detachment state is changed, how the state is changed is examined (step 203). When the display device 50 is attached to the cradle 40 by the connectors 51 and 41 and the connection of the wired connection path 20 is established, the connection mode is shifted to the wired connection mode (step 204). When the display device 50 is detached from the cradle 40, the mode is shifted to the wireless communication mode (step 205). Program control then returns to step 201.

Figure 14:
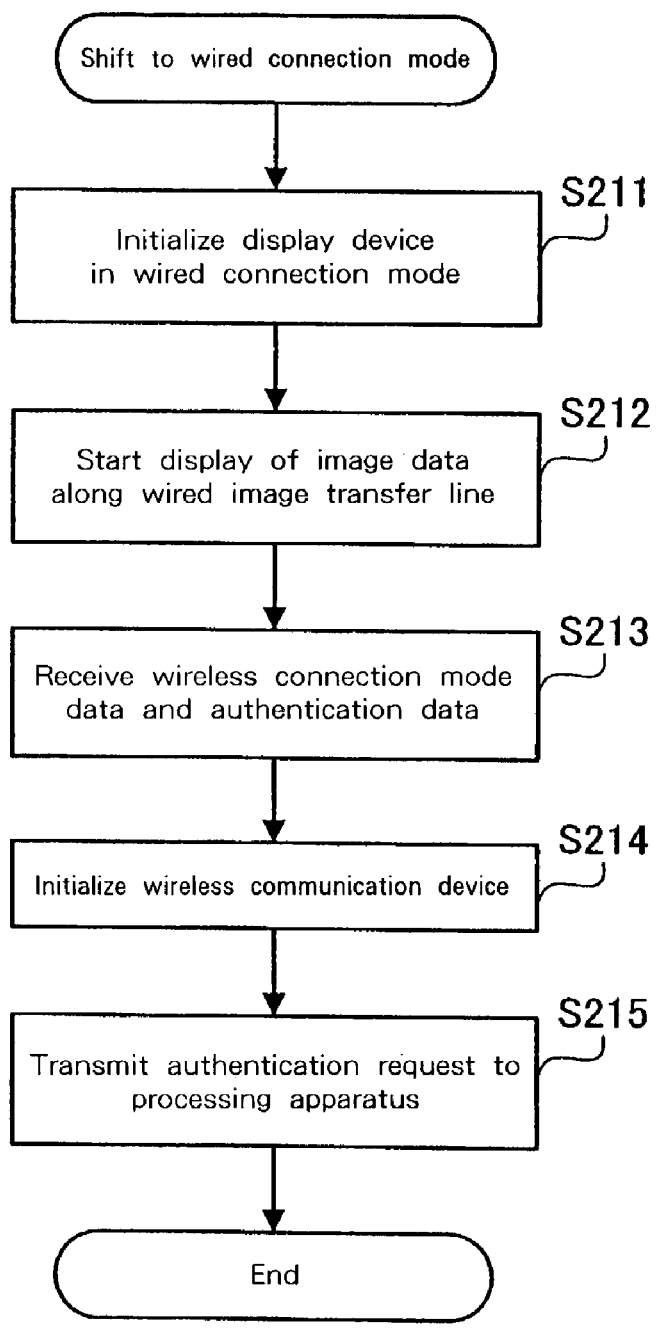
FIG. 14 is a flowchart for explaining the shift to the wired connection mode.

FIG. 14 is a flowchart for explaining the shift to the wired connection mode at step 204 in FIG. 13. To shift the mode to the wired connection mode, the display device 50 is initialized for the wired connection mode (step 211). This process includes the initialization of the wired communication device 52 and the graphics adaptor 54. As a result, the image data received from the processing apparatus 10 is displayed on the display panel 56. Then, the display of the image data is initiated by the wired image transfer line 22 of the wired connection path 20 (step 212), and the information for the wireless connection mode (wireless connection information) and the authentication information are received (step 213). The received information is that explained while referring to FIG. 8. The display device 50 initializes the wireless communication device 53 (step 214), and is logically connected to the processing apparatus 10 via the wireless connection path 30. Finally, the display device 50 transmits an authentication request to the processing apparatus 10 along the wireless connection path 30 (step 215).

As is described above, in this embodiment, the information for the wireless connection mode and the authentication information are received along the wired connection path 20, and the authentication request is transmitted along the wireless connection path 30. With this configuration, the complicated and risky setting of the wireless connection can be automatically performed, and the wired connection and the wireless connection can be changed smoothly. As a result, even a user who does not have any special knowledge can easily use the wireless connection terminal (e.g., the display device 50).

In the wired connection mode, the display device 50 receives image data along the wired image transfer line 22. The received data are transmitted to the graphics adaptor 54 through the wired communication device 52. The graphics adaptor 54 expands the image data in the frame memory 55. Further, the graphics adaptor 54 periodically reads the contents of the frame memory 55, which it then displays on the display panel 56. In this manner, when the wired connection is established, the same function as that of the conventional display device can be obtained.

Figure 15:
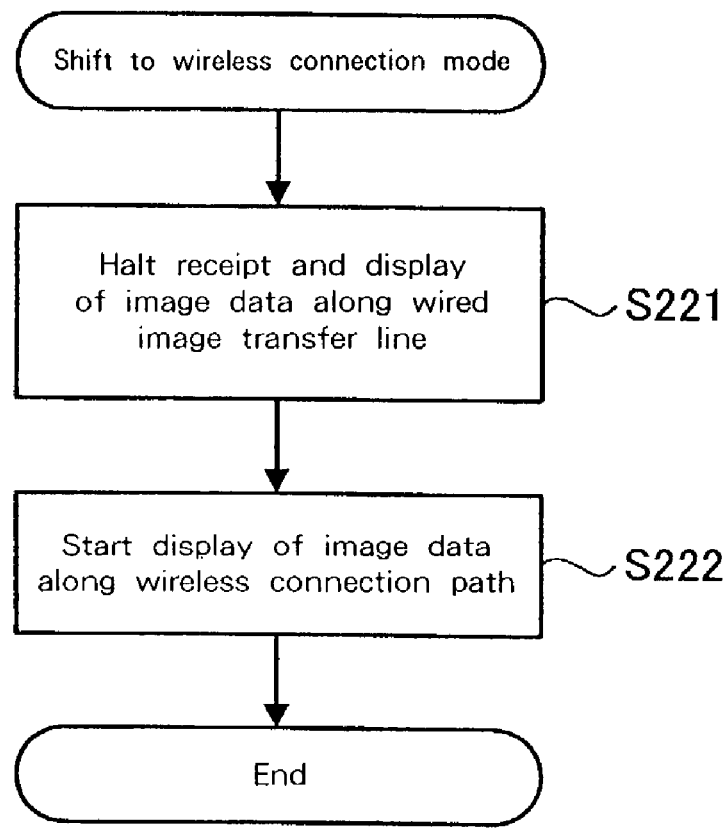
FIG. 15 is a diagram for explaining the shift to the wireless connection mode.

FIG. 15 is a diagram for explaining the shift to the wireless connection mode at step 205 in FIG. 13. The display device 50, which is a wireless connection terminal, halts the reception of image data, through the wired image transfer line 22, and its display (step 221). Thereafter, the display of the image data received along the wireless connection path 30 is initiated (step 222).

In the wireless connection mode, the wireless communication device 53 of the display device 50 receives image data or a drawing primitive from the processing apparatus 10 along the wireless connection path 30. The received data are then transmitted to the graphics adaptor 54, and based on this data, the graphics adaptor 54 expands the final image in the frame memory 55. Subsequently, to perform the display operation in the wireless connection mode, the graphics adaptor 54 periodically reads the expanded contents from the frame memory 55 and displays the data on the display panel 56. As is described above in detail, according to the embodiment, the wired connection path 20 and the wireless connection path 30 are provided for the display device 50, which is a wireless connection terminal and which in use switches between the two paths. Thus, in the wired connection mode, the same functions, performance and operability are provided as are available with a conventional display device, and specifically, the number of available colors and the screen updating speed correspond to those achieved by a conventional device. In addition, the display device 50 can be used merely by connecting it to a cable, without any special setting procedure having to be performed.

As one assumption of this embodiment, in the wired connection mode, a one-to-one cable connection is established between the host (the processing apparatus 10) and the terminal (the display device 50), and this cable is regarded as a safe communication path (control line). Further, as another assumption, the wired connection path 20, which is a wired connection cable, and the wireless link furnished by the wireless connection path 30 are not regarded as being individually exclusive, and can be used at the same time. Based on these assumptions, in the wired connection mode, information required for a wireless connection is transmitted in advance by the processing apparatus 10, which as the host accommodates the display device 50, a terminal, and an authentication operation is also completed in advance. Therefore, no particular setting process is required in order for the display device 50 to operate in the wireless connection mode. Furthermore, when the wired connection mode is shifted to the wireless connection mode, no implementing effort is required of a user. The connection mode can be changed quickly merely by detaching the display device 50 from a cable (or the cradle 40).

Further, two transmission methods are available for the transfer of display data using the wireless connection path 30: a drawing instruction protocol, based on a drawing primitive, and an image data transmission protocol, for transmitting image data as delta screen image snapshots. In addition, the two protocols can be changed dynamically in accordance with the characteristic value of the data that is being displayed, and a satisfactory display performance can thus be realized in the wireless connection mode for which the transfer function is lower than in the wired connection mode.

ADVANTAGE OF THE INVENTION

As is described above, according to the invention, the system whereby the wired connection path and the wireless connection path are established for the terminal can smoothly switch between the wired connection mode and the wireless connection mode.

Having thus described our invention, what we claim as new, and desire to secure by Letters Patent is:

1. A system comprising:
   a terminal;
   a memory; and
   a processing apparatus in communication with said memory, the processing apparatus further in communication with said terminal through a wired connection path and a wireless connection path;
   wherein said processing apparatus is configured to communicate with said terminal through the wireless connection path by one of a first wireless mode and a second wireless mode, the second wireless mode has a lower data rate than the first wireless mode,
   and the processing apparatus is configured to monitor a data size along the wired communication path from the memory to the processing apparatus for a pre-set period of time, and, after lapse of the pre-set period of time, the processing apparatus determines a value of change in the data size along the communication path for the pre-set period of time and dynamically selects the one of the first and second wireless modes based on the value of change in data size along the wired communication path, wherein the processing apparatus is configured to monitor the data size, determine the value of change, and dynamically select the wireless mode based on the value of change for a plurality of pre-set periods of time.

2. The system according to claim 1, wherein the processing apparatus further comprises a transmitter configured to use the wired communication path to transmit authentication data required for communication with said terminal along the wireless connection path, said authentication data required to permit data access by the terminal along said wireless connection path.

3. The system according to claim 2, further comprising:
a detachment means for detaching the terminal from the wired communication path;
a detector for detecting attachment of said terminal to said detachment means; and
a processing apparatus switch configured to select at least one of the wired connection path and the wireless connection path for communicating with said terminal in response to the detector.

4. The system according to claim 3, wherein the wireless path and the terminal are configured to conform with at least one of a local area network Institute of Electrical and Electronics Engineers 802.11 standard, a Transmission Control Protocol/Internet Protocol standard and a Bluetooth standard.

5. The system according to claim 4, wherein the authentication data is selected from the group comprising Extended Service Set Identity, Wired Equivalent Privacy, Internet Protocol address, gateway address, netmask and Dynamic Host Configuration Protocol data.

* * * * *